(12) United States Patent
Medlock et al.

(10) Patent No.: US 10,146,765 B2
(45) Date of Patent: Dec. 4, 2018

(54) SYSTEM AND METHOD FOR INPUTTING TEXT INTO ELECTRONIC DEVICES

(71) Applicant: TOUCHTYPE LTD., London (GB)

(72) Inventors: Benjamin Medlock, London (GB); Douglas Alexander Harper Orr, Essex (GB)

(73) Assignee: Touchtype Ltd., London (GB)

( * ) Notice: Subject to any disclaimer, the term of this patent is extended or adjusted under 35 U.S.C. 154(b) by 104 days.

(21) Appl. No.: 15/173,412

(22) Filed: Jun. 3, 2016

(65) Prior Publication Data

US 2016/0283464 A1   Sep. 29, 2016

Related U.S. Application Data

(63) Continuation of application No. 13/876,159, filed as application No. PCT/GB2011/001419 on Sep. 29, 2011, now Pat. No. 9,384,185.

(30) Foreign Application Priority Data

Sep. 29, 2010   (GB) .................... 1016385.5

(51) Int. Cl.
G06F 17/27 (2006.01)
G06F 3/023 (2006.01)

(52) U.S. Cl.
CPC .......... G06F 17/276 (2013.01); G06F 3/0236 (2013.01); G06F 3/0237 (2013.01); G06F 17/2705 (2013.01)

(58) Field of Classification Search
CPC ..... G06F 3/0233; G06F 3/0236; G06F 3/0237
See application file for complete search history.

(56) References Cited

U.S. PATENT DOCUMENTS

| 5,027,406 A * | 6/1991 | Roberts ................. G10L 15/063 704/244 |
| 5,477,451 A | 12/1995 | Brown et al. |
| 5,510,981 A * | 4/1996 | Berger ................ G06F 17/2818 704/2 |
| 5,612,690 A | 3/1997 | Levy |
| 5,649,223 A * | 7/1997 | Freeman .................... B41J 5/10 341/20 |

(Continued)

FOREIGN PATENT DOCUMENTS

| CN | 101286094 A | 10/2008 |
| EP | 1724692 | 11/2006 |
| GB | 0917753.6 | 10/2009 |

OTHER PUBLICATIONS

Alias-i, "LingPipe 4.1.0", http://alias-i.com/lingpipe, © 2003-2011, accessed Apr. 17, 2013, 18 pages.

(Continued)

Primary Examiner — Eric Yen
(74) Attorney, Agent, or Firm — Schwegman Lundberg & Woessner, P.A.

(57) ABSTRACT

A text prediction engine, a system comprising a text prediction engine, and a method for generating sequence predictions. The text prediction engine, system and method generate multiple sequence predictions based on evidence sources and models, with each sequence prediction having a sequence and associated probability estimate.

12 Claims, 10 Drawing Sheets

(56) References Cited

U.S. PATENT DOCUMENTS

| | | | | |
|---|---|---|---|---|
| 5,664,059 | A * | 9/1997 | Zhao | G10L 15/07 704/254 |
| 5,671,426 | A | 9/1997 | Armstrong, III | |
| 5,680,511 | A | 10/1997 | Baker et al. | |
| 5,748,512 | A | 5/1998 | Vargas | |
| 5,768,603 | A | 6/1998 | Brown et al. | |
| 5,805,832 | A | 9/1998 | Brown et al. | |
| 5,963,671 | A * | 10/1999 | Comerford | G06F 3/0237 345/168 |
| 6,009,444 | A | 12/1999 | Chen | |
| 6,011,554 | A | 1/2000 | King et al. | |
| 6,052,443 | A | 4/2000 | Perera et al. | |
| 6,052,657 | A | 4/2000 | Yamron et al. | |
| 6,054,941 | A | 4/2000 | Chen | |
| 6,104,989 | A | 8/2000 | Kanevsky et al. | |
| 6,125,342 | A | 9/2000 | Selesky | |
| 6,182,027 | B1 | 1/2001 | Nasukawa et al. | |
| 6,204,848 | B1 | 3/2001 | Nowlan et al. | |
| 6,219,632 | B1 | 4/2001 | Schumacher et al. | |
| 6,236,958 | B1 | 5/2001 | Lange et al. | |
| 6,253,169 | B1 | 6/2001 | Apte et al. | |
| 6,275,792 | B1 | 8/2001 | Lewis | |
| 6,286,064 | B1 | 9/2001 | King et al. | |
| 6,304,841 | B1 * | 10/2001 | Berger | G06F 17/277 704/2 |
| 6,307,548 | B1 | 10/2001 | Flinchem et al. | |
| 6,307,549 | B1 | 10/2001 | King et al. | |
| 6,321,192 | B1 | 11/2001 | Houchin et al. | |
| 6,327,561 | B1 | 12/2001 | Smith et al. | |
| 6,362,752 | B1 | 3/2002 | Guo et al. | |
| 6,393,399 | B1 | 5/2002 | Even | |
| 6,460,015 | B1 | 10/2002 | Hetherington et al. | |
| 6,484,136 | B1 | 11/2002 | Kanevsky et al. | |
| 6,490,549 | B1 | 12/2002 | Ulicny et al. | |
| 6,519,557 | B1 | 2/2003 | Emens et al. | |
| 6,625,600 | B2 | 9/2003 | Lyudovyk et al. | |
| 6,671,670 | B2 | 12/2003 | Levin et al. | |
| 6,724,936 | B1 | 4/2004 | Riemer | |
| 6,813,616 | B2 | 11/2004 | Simpson et al. | |
| 6,865,258 | B1 * | 3/2005 | Polcyn | G10L 15/26 379/265.01 |
| 6,885,317 | B1 | 4/2005 | Gutowitz | |
| 6,911,608 | B2 | 6/2005 | Levy | |
| 6,925,433 | B2 | 8/2005 | Stensmo | |
| 6,963,831 | B1 | 11/2005 | Epstein | |
| 6,965,856 | B1 | 11/2005 | Stuermer | |
| 6,993,476 | B1 | 1/2006 | Dutta et al. | |
| 7,075,520 | B2 | 7/2006 | Williams | |
| 7,092,870 | B1 | 8/2006 | Chen et al. | |
| 7,098,896 | B2 | 8/2006 | Kushler et al. | |
| 7,129,932 | B1 * | 10/2006 | Klarlund | G06F 3/0237 341/22 |
| 7,175,438 | B2 | 2/2007 | Levy | |
| 7,177,795 | B1 * | 2/2007 | Chen | G06F 17/30746 704/1 |
| 7,187,365 | B2 | 3/2007 | Harman | |
| 7,222,067 | B2 | 5/2007 | Glushnev et al. | |
| 7,251,367 | B2 | 7/2007 | Zhai | |
| 7,269,546 | B2 | 9/2007 | Stensmo | |
| 7,366,666 | B2 | 4/2008 | Balchandran et al. | |
| 7,426,505 | B2 | 9/2008 | Simpson et al. | |
| 7,453,439 | B1 | 11/2008 | Kushler et al. | |
| 7,475,010 | B2 | 1/2009 | Chao | |
| 7,487,461 | B2 | 2/2009 | Zhai et al. | |
| 7,562,016 | B2 | 7/2009 | Balchandran et al. | |
| 7,580,829 | B2 | 8/2009 | James et al. | |
| 7,610,189 | B2 | 10/2009 | Mackie | |
| 7,610,191 | B2 | 10/2009 | Gao et al. | |
| 7,706,616 | B2 | 4/2010 | Kristensson et al. | |
| 7,750,891 | B2 | 7/2010 | Stephanick et al. | |
| 7,809,575 | B2 | 10/2010 | Ativanichayaphong et al. | |
| 7,814,088 | B2 | 10/2010 | Simpson et al. | |
| 7,920,132 | B2 | 4/2011 | Longe et al. | |
| 7,996,211 | B2 | 8/2011 | Gao et al. | |
| 8,010,343 | B2 | 8/2011 | Agapi et al. | |
| 8,032,358 | B2 | 10/2011 | Helletzgruber et al. | |
| 8,073,698 | B2 | 12/2011 | Ativanichayaphong et al. | |
| 8,074,172 | B2 | 12/2011 | Kocienda et al. | |
| 8,117,144 | B2 | 2/2012 | Angell et al. | |
| 8,136,050 | B2 | 3/2012 | Sacher et al. | |
| 8,200,487 | B2 | 6/2012 | Peters et al. | |
| 8,225,203 | B2 | 7/2012 | Unruh | |
| 2002/0045463 | A1 * | 4/2002 | Chen | G06F 3/018 455/566 |
| 2002/0111806 | A1 | 8/2002 | Franz et al. | |
| 2002/0152203 | A1 | 10/2002 | Ostergaard et al. | |
| 2002/0196163 | A1 | 12/2002 | Bradford et al. | |
| 2003/0007018 | A1 | 1/2003 | Seni et al. | |
| 2003/0011574 | A1 * | 1/2003 | Goodman | G06F 3/0237 345/172 |
| 2003/0144830 | A1 * | 7/2003 | Williams | G06F 3/018 704/1 |
| 2004/0021691 | A1 | 2/2004 | Dostie et al. | |
| 2004/0083198 | A1 | 4/2004 | Bradford et al. | |
| 2004/0136564 | A1 | 7/2004 | Roeber et al. | |
| 2004/0156562 | A1 * | 8/2004 | Mulvey | G06F 3/0237 382/310 |
| 2005/0044495 | A1 * | 2/2005 | Lee | G06F 17/2223 715/257 |
| 2005/0172734 | A1 | 8/2005 | Alsio et al. | |
| 2005/0198023 | A1 | 9/2005 | James et al. | |
| 2005/0200609 | A1 | 9/2005 | Van der Hoeven | |
| 2005/0210020 | A1 | 9/2005 | Gunn et al. | |
| 2006/0055669 | A1 | 3/2006 | Das | |
| 2006/0117307 | A1 * | 6/2006 | Averbuch | G06F 17/2247 717/143 |
| 2006/0159507 | A1 | 7/2006 | Jawerth et al. | |
| 2006/0167872 | A1 | 7/2006 | Parikh | |
| 2006/0206337 | A1 * | 9/2006 | Paek | G10L 15/065 704/275 |
| 2006/0265208 | A1 * | 11/2006 | Assadollahi | G06F 3/0237 704/9 |
| 2006/0274051 | A1 | 12/2006 | Longe et al. | |
| 2006/0290656 | A1 | 12/2006 | Soong et al. | |
| 2007/0067744 | A1 | 3/2007 | Lane et al. | |
| 2007/0094024 | A1 | 4/2007 | Kristensson et al. | |
| 2007/0115343 | A1 | 5/2007 | Lessing | |
| 2007/0152979 | A1 * | 7/2007 | Jobs | G06F 3/0236 345/173 |
| 2008/0001785 | A1 * | 1/2008 | Elizarov | G06F 3/0236 341/22 |
| 2008/0040099 | A1 * | 2/2008 | Wu | G06F 17/275 704/9 |
| 2008/0040114 | A1 * | 2/2008 | Zhou | G06F 17/2785 704/257 |
| 2008/0126314 | A1 | 5/2008 | Thorn | |
| 2008/0177551 | A1 * | 7/2008 | Schalk | G01C 21/3608 704/275 |
| 2008/0189605 | A1 | 8/2008 | Kay et al. | |
| 2008/0195374 | A1 | 8/2008 | Holubar et al. | |
| 2008/0195388 | A1 | 8/2008 | Bower et al. | |
| 2008/0285857 | A1 | 11/2008 | Sharan et al. | |
| 2009/0007001 | A1 * | 1/2009 | Morin | G06F 3/0237 715/773 |
| 2009/0150322 | A1 * | 6/2009 | Bower | G06F 17/276 706/50 |
| 2009/0170536 | A1 | 7/2009 | Rang et al. | |
| 2009/0192786 | A1 * | 7/2009 | Assadollahi | G06F 3/0234 704/9 |
| 2009/0193334 | A1 * | 7/2009 | Assadollahi | G06F 17/276 715/261 |
| 2009/0216690 | A1 * | 8/2009 | Badger | G06F 3/0237 706/11 |
| 2009/0284471 | A1 | 11/2009 | Longe et al. | |
| 2010/0001958 | A1 | 1/2010 | Lu et al. | |
| 2010/0017393 | A1 | 1/2010 | Broicher et al. | |
| 2010/0121870 | A1 | 5/2010 | Unruh et al. | |
| 2010/0171700 | A1 | 7/2010 | Sharan et al. | |
| 2010/0211378 | A1 * | 8/2010 | Bulyko | G06F 17/2715 704/9 |

(56) References Cited

U.S. PATENT DOCUMENTS

| | | |
|---|---|---|
| 2010/0299135 A1* | 11/2010 | Fritsch ............... G06F 17/2785 704/9 |
| 2010/0315266 A1 | 12/2010 | Gunawardana et al. |
| 2011/0047456 A1 | 2/2011 | Sharan et al. |
| 2011/0106792 A1* | 5/2011 | Robertson ............... G10L 15/26 707/723 |
| 2011/0179032 A1 | 7/2011 | Ceusters et al. |
| 2011/0202876 A1 | 8/2011 | Badger et al. |
| 2012/0010875 A1 | 1/2012 | Helletzgruber et al. |
| 2012/0150532 A1* | 6/2012 | Mirowski ............... G06F 17/28 704/9 |
| 2012/0167009 A1 | 6/2012 | Davidson et al. |
| 2012/0197825 A1 | 8/2012 | Medlock et al. |
| 2013/0246329 A1 | 9/2013 | Pasquero et al. |

OTHER PUBLICATIONS

Briscoe et al., "The Second Release of the RASP System", Proceedings of the Coling/ACL Interactive Presentation Sessions, Jul. 2006, 77-80.

Scheffler, "Improving PPM", Mar. 2008, 13 pages.

Thede et al., "A Second-Order Hidden Markov Model for Part-of-Speech Tagging", School of Electrical and Computer Engineering, Purdue University, 1999, 8 pages.

"Non-Final Office Action Issued in U.S. Appl. No. 13/876,159", dated Sep. 4, 2015, 26 Pages.

"Third Office Action Issued in Chinese Patent Application No. 201180053255.9", dated Jul. 4, 2016, 20 Pages.

"Fourth Office Action Issued in Chinese Patent Application No. 201180053255.9", dated Jan. 3, 2017, 20 Pages.

"Office Action Issued in European Patent Application No. 11770852.9", dated Dec. 12, 2017, 6 Pages.

\* cited by examiner

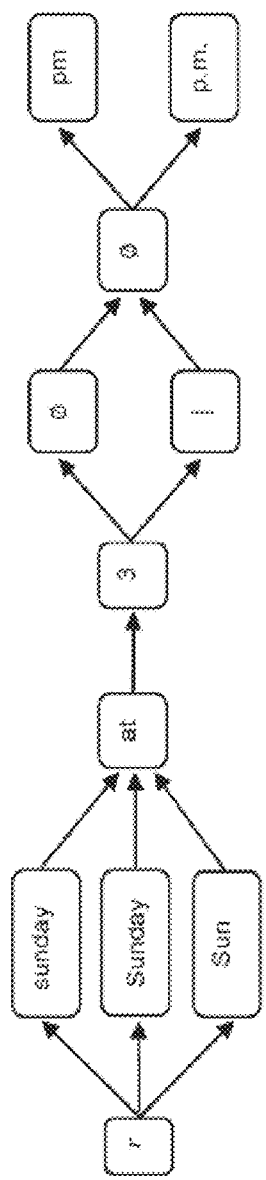
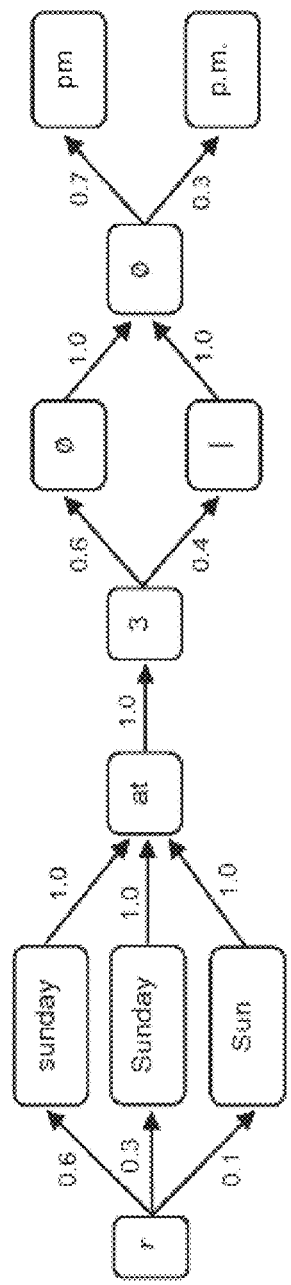
FIG. 5A
FIG. 5B

SYSTEM AND METHOD FOR INPUTTING TEXT INTO ELECTRONIC DEVICES

CROSS-REFERENCE TO RELATED APPLICATIONS

This application is a continuation of U.S. patent application Ser. No. 13/876,159, filed Mar. 26, 2013, which is a National Stage of International Application No. PCT/GB2011/001419 filed Sep. 29, 2011, which claims the benefit of British Application No. 1016385.5, filed Sep. 29, 2010, the disclosures of which are incorporated herein by reference in their entireties.

The present invention generally relates to a text prediction engine, system and method for inputting text into electronic devices.

Many existing inventions provide methods for enhancing text entry for users of electronic devices, utilising a wide range of techniques. However, it is believed that the disclosed system is the first to approach the problem of predicting the intended written text of a user using a robust, fully integrated probabilistic model.

In a first aspect of the present invention, there is provided a text prediction engine comprising: at least one model configured to generate from an evidence source a first set of sequences with associated probability estimates; a probability generator configured to receive the set of first sequences with associated probability estimates and to generate a set of sequence predictions with associated probability values, wherein the probability values are approximately normalised over all possible sequence predictions generated by the probability generator given all of the possible sequences received by the probability generator.

Preferably, the text prediction engine comprises a prior model configured to generate a second set of sequences with associated probability estimates.

Preferably, the at least one model is configured to generate a first set of sequences based on the evidence source and an uncertainty in the evidence source. Preferably, the probability generator is configured to receive the first and second sets of sequences with associated probability estimates.

The probability generator is preferably configured to estimate a normalisation factor for the probability values by summing the probability values for the n most probable sequence predictions and a constant representative of the probability values for the remaining possible sequence predictions. The constant represents the probability values for the remaining possible sequence predictions generated by the at least one model and by the prior model.

The at least one model preferably comprises a plurality of models configured to generate a plurality of first sets of sequences with associated probability estimates. In one embodiment, the plurality of models are configured to generate the plurality of first sets of sequences from a plurality of evidence sources.

Preferably, the text prediction engine is part of a system and the user inputted text can be input into the system by one or more of user selection, character entry or voice recognition.

The text prediction engine is configured to weight the probability values of the sequence predictions according to the probability that the corresponding model comprises a given context sequence. In one embodiment, the plurality of models comprise a plurality of language models corresponding to a plurality of different languages and the prediction engine is configured to weight highest the probability values of the sequence predictions corresponding to the language model relating to the most likely language of user inputted text.

Each evidence source may be modelled by a corresponding model to generate the set of sequences with associated probability estimates. The probability generator is preferably configured to treat each evidence source as conditionally independent of all other evidence sources, given the set of sequence predictions.

In a preferred embodiment of the text prediction engine, the at least one model comprises a context model and an input model, each of which is configured to receive text input by a user and to generate a set of sequences and associated probability estimates; and the prior model comprises a target prior model configured to generate a set of sequences and associated probability estimates. The input model preferably comprises a candidate model and a language model. The context model preferably comprises a candidate model and a prefix match model. The target prior model preferably comprises a character model and a unigram model.

In a second aspect of the present invention, there is provided a system comprising: a user interface configured to receive text input by a user, a text prediction engine configured to receive the text input from the user interface and to generate a set of sequence predictions with associated probability values, wherein the probability values are approximately normalised over all possible sequence predictions; wherein the text prediction engine is further configured to provide the set of sequence predictions to the user interface.

Preferably, the input model comprises a candidate model and a language model. Preferably, the context model comprises a candidate model and a prefix match model. Preferably, the target prior model comprises a character model and a unigram model.

In a third aspect of the invention, there is provided a method for processing user text input comprising: receiving text input into a user interface; generating, using a text prediction engine, a set of sequence predictions and associated probability values, wherein the probability values are approximately normalised over all possible sequence predictions; providing the set of sequence predictions to the user interface.

Generating normalised probability values preferably comprises estimating a normalisation factor for the probability values by summing the probability values for the n most probable sequence predictions and a constant representative of the remaining possible sequence predictions.

The method may further comprise displaying the set of sequence predictions on the user interface for user selection. Preferably, the sequence predictions are ordered by the text prediction engine for ordered display by the user interface. The sequence predictions may be provided to the user interface only if their corresponding probability values are each greater than or equal a first threshold value. Similarly, the system may be configured to provide to the user interface predictions only if their corresponding probability values are each greater than or equal a first threshold value.

Preferably, the at least one of the set of sequence predictions corresponds to an adjusted or corrected version of text input by a user into the user interface.

The method may further comprise inputting automatically a sequence prediction which has a probability value greater than or above a second threshold value. Similarly, in one embodiment, the system may be configured to input automatically a sequence prediction which has a probability value greater than or above a second threshold value.

The probability generator used in the method preferably comprises a plurality of models, each configured to generate a set of sequence predictions and associated probability values, and the probability values are weighted according to the probability that the corresponding model comprises a given context sequence.

The present invention also provides a computer program product comprising a computer readable medium having stored thereon computer program means for causing a processor to carry out the methods as described above.

The invention also relates to a text prediction engine for generating sequence predictions, and a system and method for generating sequence predictions for display and user selection. In one embodiment, the invention relates to a system for automatically correcting an erroneously entered sequence, and a method for doing so. In a preferred embodiment, the present invention provides a text prediction engine, a system and method for generating a final set of sequence predictions, each with an associated probability value, by combining any number of separate probability estimates for sequence intentions. The present prediction engine, system and method can therefore provide predictions which are based on any number of independent evidence sources. This can be achieved by the assignment of a true probability to each of the predicted sequences, rather than just a ranking over sequences. By assigning true probability values, evolution of the probabilities assigned to different terms can be analysed and probabilities for a given term, or set of terms, at two different points in time can be compared. This means that a-priori thresholding can be utilised to moderate the behaviour of the system given its "confidence" in a particular prediction. For instance, a predicted sequence might only be displayed, or an automatic correction made, if the system estimates the probability of accuracy at over 0.75, or in other words if there is at least a 75% chance that the predicted sequence is accurate. This type of inference is impossible if some kind of ad-hoc score is used to rank elements, as such values cannot be reliably compared between sequences over time.

To generate the true probability values, the present invention preferably provides a means for efficiently approximating the normalisation sum over all sequences.

BRIEF DESCRIPTION OF THE DRAWINGS

The present invention will now be described in detail with reference to the accompanying drawings, in which:

FIGS. 5a and 5b illustrate example probabilistic conctrained sequence graph, in accordance with some embodiments.

DEFINITIONS character—a symbol representing an atomic orthographic unit
character set—a finite collection of characters
sequence—a finite length, ordered string of characters
prefix—one sequence s is a prefix of another s' if, beginning with the first character in each sequence, there is a contiguous, one-to-one mapping and length(s)≤length(s').
proper prefix—one sequence s is a proper prefix of another s' if as is a prefix of s' and length(s)<length(s').
language—a (usually infinite) set of sequences characteristic of a particular written or spoken community
text—written data drawn from one or more languages
system—the subject of this disclosure
user—an intentional agent interacting with the system In general, but not exclusive terms, the system of the invention can be implemented as shown in FIG. 1. FIG. 1 is a block diagram of one high level text prediction architecture according to the invention. The system comprises a text prediction engine which generates a set of most likely sequence predictions $S_F$ intended to be entered by the user. Each sequence prediction has a probability value associated with it.

Figure 1:
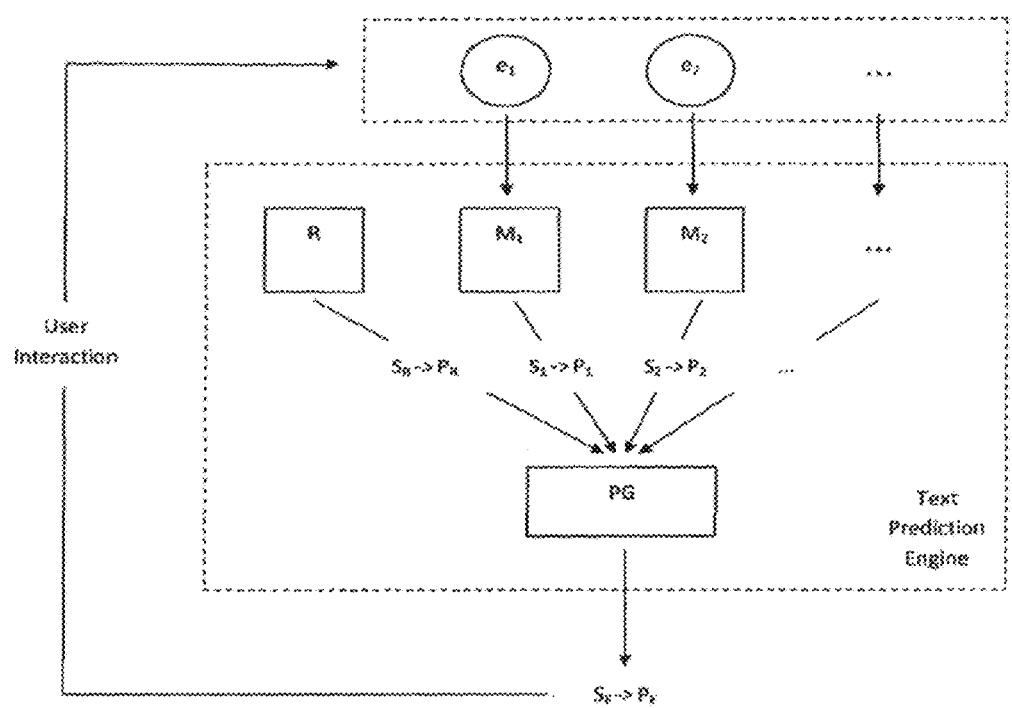
FIG. 1 is a schematic of a high level prediction architecture according to the invention.

As can be seen from FIG. 1, the text prediction engine preferably comprises a plurality of trained models $M_1$, $M_2$, $M_3$ etc. that will be used to make probabilistic inferences from a plurality of evidence sources $e_1$, $e_2$, $e_3$, etc.; and a probability generator (PG). However, in other embodiments, there may be a single trained model and single evidence source.

There are arbitrarily many potential sources of evidence $e_1$, $e_2$, etc. Some examples of which include:
the sequence the user has already entered
the term/phrase the user is currently entering
stored, historical sequences entered by the user
the user's native language
the specific style of language being entered
the application in which the current sequence is being entered
in a messaging environment, the intended message recipient
the time/date
the location of the device hosting the system General Model The aim of the system is to rank sequences in a given subset of a language by the likelihood that the user intended/intends to enter that sequence. In probabilistic terms, this equates to a ranking over sequences in a set S governed by the following:

$$P(s \in S | e, M) \qquad (1)$$

where e is the observed evidence, and M is the set of trained models that will be used to make probabilistic inferences. In other words, the system will estimate the conditional probability, over the set of all sequences from which predictions can be drawn, of the sequence given the evidence e. The target sequence is denoted by s.

In order to simplify the process of combining predictions from different data sources, in a preferred embodiment, the target sequence, s, is defined as a prediction which comes from a specific data source.

Each model in M is trained on a particular data source. Thus, a particular data source is represented by a model in M, and the set S in expression (1) ranges over all distinct terms (or sequences) generated by the models in M. A model is queried to provide a predicted term. This term is associated with the model from which it was drawn, and is therefore different from a lexically identical term drawn from a different model, due to its association with the model from which it was drawn. This association can be implicit in the data. However, the term could be tagged with an identifier associated with the model from which it has been drawn.

In this preferred process of combining predictions, two otherwise identical predictions that come from different data sources are considered different. To combine sequences from different models to get a list of predictions, the sequences are simply ranked with duplicate predictions removed. In the preferred implementation, the most probable estimate is retained for a given lexical term/sequence and any (less probable) lexical duplicates are discarded.

By way of a non-limiting example, if M comprises two context language models, French ($LM_{French}$) and English ($LM_{English}$), the term "pain" will probably occur in both, and will appear twice in S, once linked with the French model and once with the English model. This will result in two separate estimates for the term "pain" given a particular set of evidence (where the evidence in this case is the context which precedes the predicted term "pain").

These estimates refer to two distinct sequences (one from French, one from English); however, because they are lexically identical, it is not necessary to present them both to the user. Thus, in accordance with the preferred embodiment, the most probable estimate for a given lexical sequence is retained and any lexical duplicates are discarded.

In order to rank sequences in a given subset of a language by the likelihood that the user intended/intends to enter that sequence, the conditional probability of expression (1), P(s∈S|e,M), needs to be calculated. To determine this probability, the expression is rearranged using Bayes' rule to yield:

$$\frac{P(e|s,M)P(s|M)}{P(e|M)} \quad (2)$$

and marginalised over target sequences in the denominator to yield:

$$\frac{P(e|s,M)P(s|M)}{\sum_{j=1}^{|S|} P(e|s_j,M)P(s_j|M)} \quad (3)$$

In order to compute P(e|s,M), in a preferred embodiment, it is assumed that the evidence can be separated into non-overlapping sets, [$e_1 \ldots e_N$], that are independently generated from some distribution under an associated model [$M_1 \ldots M_N$], given the target sequence. This independence assumption can be written as:

$$P(e|s,M) = \Pi_{i=1}^{N}[P(e_i|s,M_i \in M)] \quad (4)$$

and stated as:

Assumption 1: Evidence can be separated into distinct sets, such that the evidence in each set is conditionally independent of all others, given the target sequence;

where each $e_i$ has a model $M_i$ associated with it. This will allow a framework to be constructed in which it is possible to combine arbitrarily many sources of evidence in a computationally efficient manner. In a preferred embodiment, a model R∈M is associated with a target sequence prior. Given this assumption we can restate (3) as follows:

$$\frac{P(s|R)\prod_{i=1}^{N} P(e_i|s, M_i)}{\sum_{j=1}^{|S|} P(s_j|R)\prod_{i=1}^{N} P(e_i|s_j, M_i)} \quad (5)$$

Thus, in a preferred embodiment, the conditional probability of expression (1) can be computed by computing the target sequence prior, P(s|R), and each of the evidence likelihoods, P($e_i$|s,$M_i$).

The denominator in expression (5) is constant with respect to s and therefore does not affect the ranking, rather it is a normalisation factor on computed probability values. In a preferred embodiment this value is estimated as the sum of a subset of the most probable sequences and a constant, to overcome the problem of having to compute the conditional probability over all sequences in S (see expressions 13-15 below). This approach is reasonable due to the Zipfian nature of many natural language phenomena, where a minority of likely events carry the majority of the probability mass. The Zipfian distribution is an instance of a power law distribution, in which the frequency of a given event is approximately inversely proportional to its rank.

Expression (5) provides a principled approach to combining different sources of evidence about text entry intentions, and in the preferred system of the present invention is implemented by a set of trained models R, $M_1$, $M_2$, ... generating a set of sequences $S_R$, $S_1$, $S_2$, ... and an associated set of conditional likelihood values $P_R$, $P_1$, $P_2$, ... given a source of evidence $e_1$, $e_2$, .... The model R is used to compute the prior target sequence probability P(s|R), while each model $M_1$, $M_2$, ... computes the respective evidence likelihood P($e_i$|s,$M_i$). Each model outputs a set of sequences $S_i$ and a set of associated conditional probabilities $P_i$. Each model $M_1$, $M_2$, ... may comprise one or more sub-models. The probability generator PG takes the sequences and associated conditional probabilities as input and outputs a final set of sequences Sp associated with probability values $P_F$. The probability generator PG can combine the predictions as described in the preferred process above, i.e. the predictions are ranked in order of probability and any duplicate predictions are simply removed. The set of sequences $S_F$ associated with the final probability values $P_F$ can be presented, for example in a list format, on a user interface of the system, for user review and selection. The user interacts with the system by making prediction selections or manipulating the device on which the system resides in other ways, thus updating the evidence. Each model R, $M_1 \ldots M_N$ may be updated as text is input into the system.

The present invention provides two preferred methods for computing evidence likelihoods within a probabilistic framework by marginalising over candidate interpretations of the evidence, represented in a graph framework, although other methods may be utilised. These two preferred methods will now be discussed.

Candidate Model 1

When forming an estimate of the likelihood of the evidence from a single evidence source, $P(e_i|s,M_i)$, it is often helpful to express the model in terms of 'candidates', which are intermediate stages between the 'user-intended' sequence, and the observed evidence. If expressed in terms of candidates, the likelihood $P(e_i|s,M_i)$ can be re-written as:

$$P(e|s,M) = \sum_{j=1}^{K} P(e|c_j,s,M_{candidate})P(c_j|s,M_{sequence}) \quad (6)$$

where $c_j$ is a single candidate, and there are now two submodels of M for a given evidence source: the candidate model $M_{candidate}$ and the sequence model $M_{sequence}$. The key assumption here is as follows:

Assumption 2: The likelihood, under the model in question, can be expressed as a marginalization over candidates, where the evidence is conditionally independent of the target sequence given the candidate.

Applying this assumption, the dependence on s can be dropped from the evidence term:

$$P(e|s,M) = \sum_{j=1}^{K} P(e|c_j,s,M_{candidate})P(c_j|s,M_{sequence}) \quad (7)$$

Figure 3:
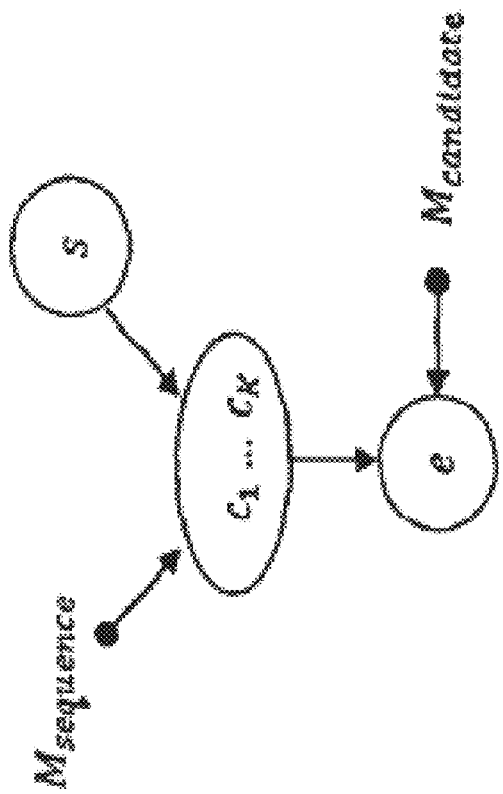
FIG. 3 illustrates an example of a graphical model describing the relationship between variables and models, in accordance with some embodiments.

The properties of the candidate model can also be encoded in the form of graphical models describing the relationship between the variables and models, for example as shown in FIG. 3.

Candidate Model 2

Another variant of the candidate model first transforms the evidence likelihood using Bayes' rule:

$$P(e|s,M) = \frac{P(s|e,M)P(e|M)}{P(s|M)} \quad (8)$$

In an embodiment, the evidence conditional sequence probability can be re-written as:

$$P(s|e,M) = \sum_{j=1}^{K} P(s|c_j,e,M_{sequence})P(c_j|e,M_{candidate}) \quad (9)$$

where $c_j$ is a single candidate, and as before, there are two submodels of M for a given evidence source: the candidate model $M_{candidate}$ and the sequence model $M_{sequence}$. In this case, the key assumption is:

Assumption 3: The likelihood, under the model in question, can be expressed as a marginalization over candidates, where the target sequence is conditionally independent of the evidence, given the candidate.

Applying this assumption, the dependence on s can be dropped from the evidence term:

$$P(s-e,M) = \sum_{j=1}^{K} P(s|c_j,M_{sequence})P(c_j|e,M_{candidate}) \quad (10)$$

Figure 4:
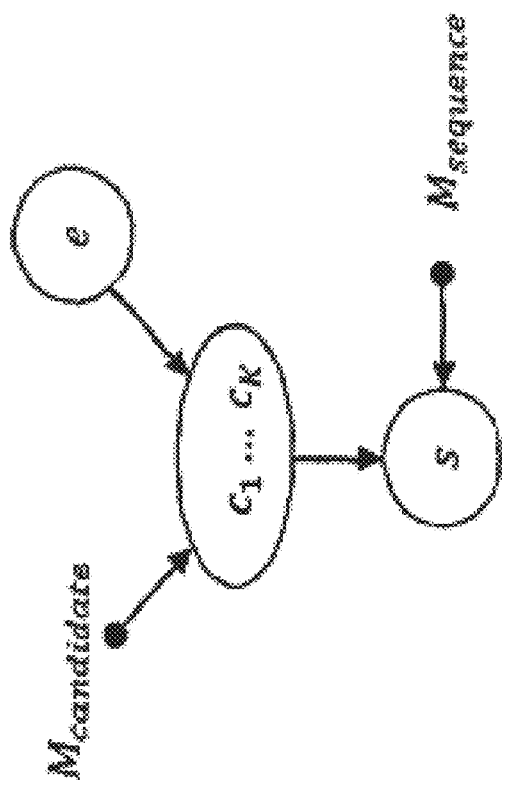
FIG. 4 illustrates an example of a graphical model for a version of a candidate model, in accordance with some embodiments.

The graphical model for this version of the candidate model is illustrated in FIG. 4.

and the full evidence likelihood is:

$$P(e|s,M) = \frac{\sum_{j=1}^{K} P(s|c_j,M_{sequence})P(c_j|e,M_{candidate})P(e|M)}{P(s|M)} \quad (11)$$

Specific Model

Figure 2:
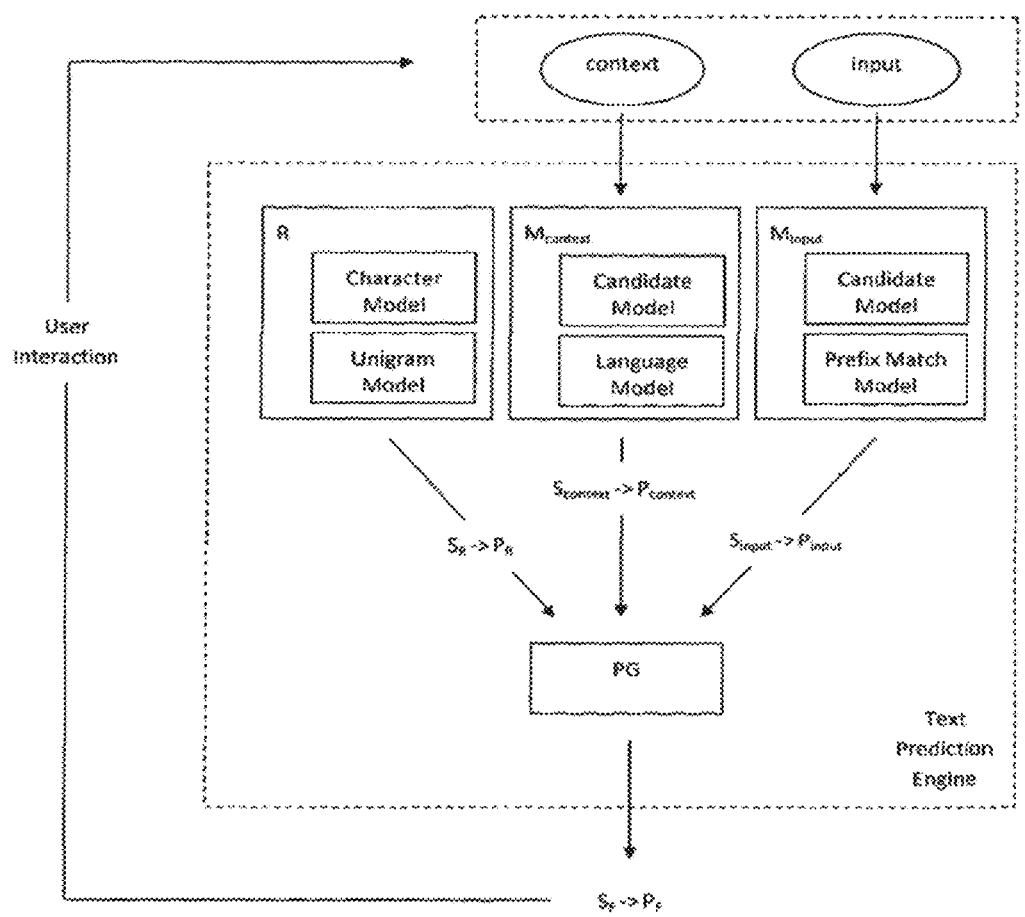
FIG. 2 is a schematic of an example of a preferred prediction architecture according to the present invention.

Using the general and candidate models, we now present a specific example of the system with reference to FIG. 2, which illustrates a preferred instantiation of the system in which the prediction engine takes evidence from two distinct sources: context and input. However, as stated above, the system is not limited to taking the context and input sources as evidence. If other, or additional, evidence sources are used the system will be correspondingly configured to generate predictions on the basis of such evidence sources.

Informally, the context represents the observed evidence about what the user has already entered, while the input represents the observed evidence about what the user is currently entering. For instance, in English, if the user has entered the sequence "My name is B", we might consider the context evidence to be the sequence "My name is", and the input evidence to be the sequence "B". This is however, only by way of example, and it should be noted that in the most general form, the model says nothing concrete about the specific form of the observed evidence. For instance, the input evidence might actually be a series of touch coordinates from a virtual 'keyboard'.

As shown in FIG. 2, the evidence (input and context) is used as input to the prediction engine, within which there are preferably three models R, $M_{context}$, $M_{input}$, each of which is preferably comprised of at least two sub-models (character model, unigram model; candidate model, language model; candidate model, prefix match model). As can be seen in FIG. 2, the prediction engine preferably comprises a target sequence prior model R. Although preferred, the system is not limited to embodiments which include a target sequence prior model R.

The target sequence prior model R consists of

Character Model—implements a distribution over sequences in a language without the concept of a fixed vocabulary. Usually implemented as a Markov model over character sequences.

A character model is a sequence model built from characters instead of words. For instance, if the training set is "explaining", a unigram character model might look like this:

$P(e)=0.1$
$P(x)=0.1$
$P(p)=0.1$
$P(l)=0.1$
$P(a)=0.1$
$P(i)=0.2$
$P(n)=0.2$
$P(g)=0.1$

A trigram character model might be as follows:

$P(e)=0.1$
$P(x|e)=1.0$
$P(p|ex)=1.0$
$P(l|xp)=1.0$
$P(a|pl)=1.0$
$P(i|la)=1.0$
$P(n|ai)=1.0$
$P(i|in)=1.0$
$P(n|ni)=1.0$
$P(g|in)=1.0$

Unigram Model—implements a distribution over sequences in a language without taking context into account, internally treating each sequence as an atomic entity.

For example, if the training set is "the dog chased the cat", the corresponding unigram language model might be:
$P(the) \rightarrow 0.4$
$P(dog) \rightarrow 0.2$
$P(chased) \rightarrow 0.2$
$P(cat) \rightarrow 0.2$ The context evidence model $M_{context}$ is comprised of Candidate Model—implements a conditional distribution over context observations given a particular candidate interpretation.

Sequence Model—implements a conditional distribution over sequences in a language, or set of languages, given a particular context. In FIG. 2, the sequence model is illustrated as a language model which, in a preferred embodiment, comprises a set of language models corresponding to different languages, e.g. $LM_{French}$, $LM_{German}$, $LM_{English}$, etc.

The input evidence model $M_{input}$ is comprised of:

Candidate Model—implements a conditional distribution over input observations given a particular candidate interpretation.

Sequence Model—implements a conditional distribution over candidates given an intended target sequence. This model is illustrated in FIG. 2 as a "prefix match model".

Each model, including the target sequence prior model R, may be updated with user entered text, depending on the scenario. By using dynamic language models, the system is able to more accurately predict a given user's intended text sequence.

Each model outputs a set of sequences $S_R$, $S_{context}$, ..., $S_{input}$ and associated probability estimates $P_R$, $P_{context}$, $P_{input}$ which are used as input for the probability generator PG. The probability generator PG combines the probability estimates $P_R$, $P_{context}$, $P_{input}$ output from the models to generate a set of probability values $P_F$ for the final sequence predications $S_F$.

The final predictions $S_F$ can be displayed to the user via a user interface for user review and selection, or used by the system to automatically correct erroneously entered text. Once a prediction has been selected, either automatically or by the user, this input is preferably added to the context evidence which is used to generate further predictions. If instead the user adds further input about the current word, by entering further characters, this is preferably added to the input evidence to alter the current probabilities assigned to the predictions.

The particulars of how the specific system of this embodiment may be generated from the mathematical basis will now be explained.

Instantiating expression (5) with the two evidence sources yields:

$$\frac{P(s \mid R) P(\text{context} \mid s, M_{context}) P(\text{input} \mid s, M_{input})}{Z} \quad (12)$$

where Z=the normalisation constant, approximate to:

$$\sum_{j=1}^{|S|} P(s_j \mid R) P(\text{context} \mid s_j, M_{context}) P(\text{input} \mid s_j, M_{input}) \quad (13)$$

This approximation is implemented in the system as follows. Let us consider a function z over a set of sequences T, such that $$z(T) = \sum_{j=1}^{|T|} P(s_j \mid R) P(\text{context} \mid s_j, M_{context}) P(\text{input} \mid s_j, M_{input}) \quad (14)$$

Z is computed as:

$$Z = z(T) + z(\{u\}) * k \quad (15)$$

where u represents an "unknown" sequence, and k is an estimate of $|S|-|T|$, where $|S|$ is the number of sequences in the set of all possible target sequences, and $|T|$ is the number of sequences for which at least one of the underlying evidence models has a "known" estimate. Each individual evidence conditional model M will return an estimate of P(e|u,M), i.e. a distribution over evidence observations given the "unknown" sequence. In essence, this means that each evidence conditional model is responsible for its own distributional smoothing, but this must be related to k which is proportional to the overall estimated number of "unknown" sequences. In practice, each model will "know" about a set of sequences S' where $S' \subset S$, and estimates of P(e|s,M) will be constant and equivalent to P(e|u,M) for all $s \notin S'$. Smoothing of this nature is the means by which the system takes into account the varying levels of confidence in the models associated with each evidence source.

According to expressions (12) and (14), in order to determine the conditional probability $P(s \in S|e,M)$ for the example instantiation of the specific system, the following estimates are computed: a target sequence prior P(s|R); a context likelihood $P(\text{context}|s, M_{context})$; and an input likelihood $P(\text{input}|s, M_{input})$. Each of these estimates and how it may be computed is discussed below.

Target Sequence Prior

The target sequence prior is preferably computed as follows:

$$P(s \mid R) = \begin{cases} P(s \mid R_{unigram}) & \text{if } (s \in V) \\ P(s \mid R_{character}) & \text{otherwise} \end{cases}$$

where V is the set of sequences contained in $R_{unigram}$ and the implementation of the models is according to known techniques for constructing smoothed frequency-based unigram language models and smoothed Markov chain character models. A number of applicable techniques for implementing these models are listed below. However, other suitable techniques not listed also apply.

Smoothed n-gram term or character models (known in the art).

Adaptive multi language models as described in <ref: UK patent application no. 0917753.6>.

PPM (prediction by partial matching) language models, as described in e.g. <ref:Scheffler 2008>.

Morphological analysis engines configured to generate sequences probabilistically from constituent lexical components.

By including a target sequence prior model R, the system provides an improved accuracy of intended sequence prediction. Furthermore, the target sequence prior model R enables character-based inference of unseen target sequences, i.e. the system is better able to infer unknown target sequences to approximate across all possible target sequences.

Context Likelihood

The context likelihood, $P(\text{context}|s, M_{context})$, is preferably estimated by means of the second candidate model to provide expression (16) below. Although this is the preferred means to estimate the likelihood, the invention is not limited to the likelihood being estimated in this way.

$$P(\text{context} \mid s, M_{context}) = \quad (16)$$

$$\frac{\sum_{j=1}^{K} P(s \mid c_j, M_{context\text{-}sequence}) P(c_j \mid \text{context}, M_{context\text{-}candidate}) P(\text{context} \mid M_{context})}{P(s \mid M_{context})}$$

Thus, to determine the context likelihood, each of the following are computed: a context sequence estimate $P(s|c_j, M_{context\text{-}sequence})$; a context candidate estimate $P(c_j|context, M_{context\text{-}candidate})$; a context prior estimate $P(context| M_{context})$; and a target sequence prior estimate $P(s|M_{context})$. Each of these estimates and how it may be computed is discussed below.

Context Sequence Estimate

The context sequence estimate $P(s|c_j, M_{context\text{-}sequence})$ is the probability of the target sequence s given a particular candidate sequence $c_j$, under the context sequence model. Formally the context sequence model is a function that returns the probability of a target sequence given a context sequence, i.e. $f_s(t_{target}, t_{context}) = P(t_{target}|t_{context}, \theta_s)$ where $\theta_s$ are the parameters of the model. Thus, the context sequence probability is computed as: $P(s|c_i, S) = f_s(s, c_i)$. A wide range of different techniques can be used to compute this estimate, for example, smoothed frequency analysis on the context training data, in a similar way to equation (21), and as described in relation to the target sequence prior estimate. Alternatively, any of the following can be used, individually or in combination:

An n-gram language model (known in the art).
An adaptive multi language model as described in <ref: GB patent application no. 0917753.6>.
A PPM (prediction by partial matching) language model, as described in <ref:Scheffler 2008>.
A generative HMM (Hidden Markov Model) probabilistic part-of-speech tagger <ref:Alias-i. 2008. LingPipe 4.1.0. http//alias-i.com/lingpipe (accessed Sep. 26, 2011) or Thede, S. M., Harper, M. P., 1999>
A natural language parser configured to return probabilities for partial sentences, such as RASP <ree Briscoe, E., J. Carroll and R. Watson 2006>.
A neural network configured to accept as input features representing the contextual and target sequence, and output probabilities (known in the art).

The system is not limited to the above techniques; any other technique which can be used to compute the context sequence probability is applicable.

As stated previously, $M_{context\text{-}sequence}$ may comprise a plurality of language models corresponding to a plurality of different languages. To determine the conditional probability of equation (16), the conditional probability is determined using the language model associated with the term. As an explanation, the previous example of the prediction term "pain" being drawn from an English language model ($LM_{English}$) and a French language model ($LM_{French}$) is referred to. In this situation, equation (16) is determined as $P(context|pain, LM_{English})$ and $P(context|pain, LM_{French})$, where "Pain" drawn from $LM_{French}$ is different from that drawn from $LM_{English}$, even though the predictions are lexically identical. By associating the term with the model from which it is drawn, the system simplifies the way in which lexically identical terms are dealt with, since only the most probable term is retained from two or more lexically identical terms. Furthermore, the system provides a simplification of the calculation of the conditional probabilities of equation (16). This is possible because, although lexically identical, the terms may have a different meaning in different languages and can therefore be treated as distinct.

Thus, turning to FIG. 2, the set of terms $S_{context}$ generated by the model $M_{context}$ may comprise terms from any one of the language models (or candidate models) contained within $M_{context}$.

Context Candidate Estimate

The context candidate estimate $P(c_j|context, M_{context\text{-}candidate})$ is a function of the form: $f_{context\text{-}candidate}(t) = P(t|\theta_{context\text{-}candidate})$ where t is an arbitrary sequence and $\theta_{context\text{-}candidate}$ are the parameters of the model. Thus, the context candidate conditional estimate is computed as: $P(c_j|context, M_{context\text{-}candidate}) = f_{context\text{-}candidate}(c_j)$.

In a preferred system, a context candidate is a sequence, and the set of context candidates is represented as a directed acyclic graph (DAG) where each node contains a subsequence consisting of one or more characters. Each of the edges is assigned a probability and, in a preferred embodiment, the DAG preferably also has the special property that each path is constrained to be the same length. This type of variant DAG is termed in this document as a probabilistic, constrained sequence graph (PCSG). Each individual candidate sequence is then represented by a unique path through the PCSG and the context candidate model function return value for a given candidate is computed as the probability of its representative path.

Formally, a PCSG consists of a 4-tuple containing a set of nodes N, a root node r, a set of directed edges E, and a set of parameters (probabilities) $\theta$:

$$G = (N, r, E, \theta) \quad (17)$$

An edge between two nodes n and n' is denoted by $(n \rightarrow n')$, and the probability of moving from n to n' along the edge is denoted by $P(n'|n)$. A path through G begins at node r and follows exactly one outgoing edge from each visited node until reaching a node that contains no outgoing edges. The following properties hold of G:

1) G is a directed, acyclic graph (DAG)
2) $\forall n \in N. \nexists m. (m \rightarrow n) \in E \Rightarrow n = r$ i.e. all nodes except for the root must have at least one incoming edge.
3) $\exists m, k \in N. \forall n \in N. (m \rightarrow n) \in E \Rightarrow (n \rightarrow k) \in E$ i.e. all paths branching from a given node rejoin immediately at a subsequent common node. This property severely constrains the structure of the graph and implies that all paths have the same length, mitigating normalisation requirements on path probability computations.

The context candidate model function computes the probability of a given path as follows (equated with the context candidate estimate):

$$P(c_j|context, M_{context\text{-}candidate}) = f_{context\text{-}candidate}(c_j) = P(p_j|G) \quad (18)$$

where $P(p_j|G)$ is the path likelihood, computed as the product of each of the edges in the path:

$$P(p_j|G) = P(n_1|r) \Pi_{k=2}^{K} P(n_k|n_{k-1}) \quad (19)$$

where K is the number of edges in the path. It can be noted that this preferred formulation amounts to an implicit independence assumption between nodes. This is so because in this case the sequential probability of the candidate sequence is not modelled, rather the probability of variations within the candidates is modelled. Hence, the following property holds over the probabilities on edges:

$$\forall n \in N. \Sigma_{(n \rightarrow m) \in E} P(m|n) = 1 \quad (20)$$

In other words, the probabilities on all outgoing edges from a given node n must sum to one. This also implies that the following holds: $\Sigma_i P(p_i|G) = 1$ i.e. the sum over the probability of all paths in the PCSG equals one.

An example will help to clarify these concepts. Consider the following twelve context candidate sequences:

| "Sunday at 3pm" | "sunday at 3pm" | "Sun at 3pm" |
| "Sunday at 3 pm" | "sunday at 3 pm" | "Sun at 3 pm" |
| "Sunday at 3p.m." | "sunday at 3p.m." | "Sun at 3p.m." |
| "Sunday at 3 p.m." | "sunday at 3 p.m." | "Sun at 3 p.m." |

These would be represented by the PCSG illustrated in FIG. 5a (explicit word boundary denoted by '|' and the empty sequence by 'Ø').

Probabilities are assigned to the edges according to the context candidate model, following (19), as illustrated in FIG. 5b.

Candidate probabilities for the twelve sequences above are then generated from the PCSG as follows (showing just three examples for brevity):

P("sunday at 3 pm"|"sunday at 3 pm", C)=0.6*1.0*1.0*0.6*1.0*0.7=0.252
P("Sunday at 3 pm"|"sunday at 3 pm", C)=0.3*1.0*1.0*0.4*1.0*0.7=0.084
P("Sun at 3 p.m."|"sunday at 3 pm", C)=0.1*1.0*0.4*1.0*03=0.012

The specifies of the model used to construct the DAG and assign probabilities to nodes will vary depending on the particular instance of the system. The above schema encodes instances of three general variations:
branch (potentially unambiguously) at word boundaries
branch at case variation
branch at lexical variation It will be understood that any type of variation can be encoded in this framework. Another example would be to branch on previous suggestions, e.g. if the system had predicted both "on" and "in" and the user had selected "in", this can be encoded as a branch with the weight of probability assigned to "in" but with a small probability assigned to "on" to represent the possibility that the user accidentally accepted the wrong suggestion. In the above case, the following principles are encoded:
  'sunday' with a lower case initial 's' is less probable than the abbreviated form 'Sun', which is itself less probable than the full variant 'Sunday'.
  The tokenisation case where "pm" is separated from the number "3" is slightly less probable than the case where it's not.
  The period variant "p.m." is somewhat less probable than the non-period form "pm".

A particular instance of the context candidate PCSG is preferably constructed algorithmically from an initial sequence s in the following manner.
1) Turn s into a PCSG by encapsulating it within a single node $n^s$, connected to the root.
2) Iteratively deconstruct $n^s$ by introducing branching nodes at variation points.

Figure 6A:
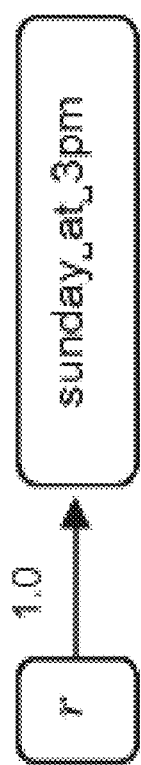
FIGS. 6a, 6b, 6c, and 6d illustrate example steps for the construction of a probabilistic constrained sequence graph, in accordance with some embodiments.

For example, the PCSG construction algorithm operating on an original sequence "sunday at 3 pm" is considered. Step 1 is illustrated in FIG. 6a.

Figure 6B:
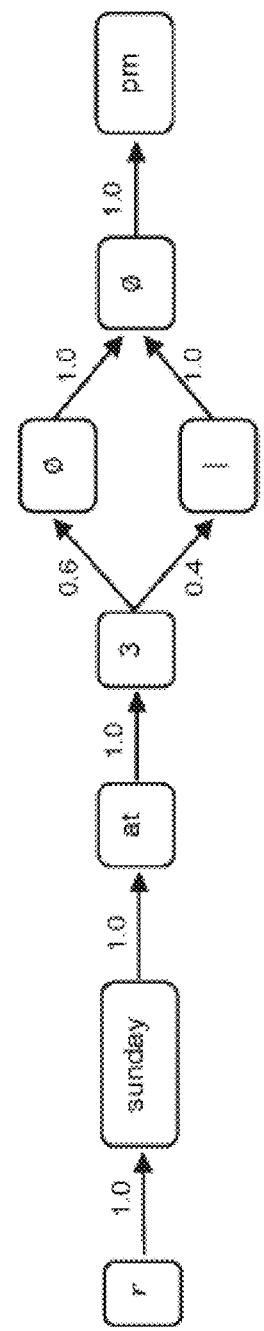

The system deploys a probabilistic tokeniser, resulting in FIG. 6b.

Note that a modification will always take the form of a branch-and-rejoin structural insertion, due to PCSG property 3 above, with the special case being a branch of one node, which is a convenience for subsequent processing as it does not affect overall path probabilities. Edge probabilities are added according to the model, which is explained in further detail below.

Figure 6C:
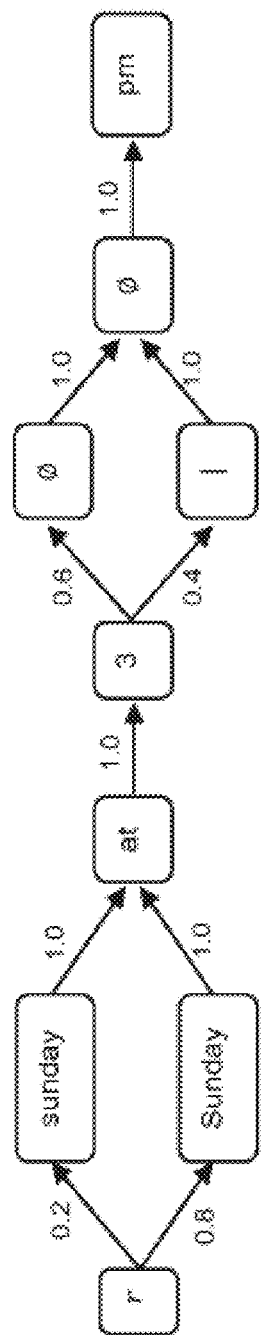

Continuing the algorithm, a case variant analyser is deployed as illustrated in FIG. 6c.

Figure 6D:
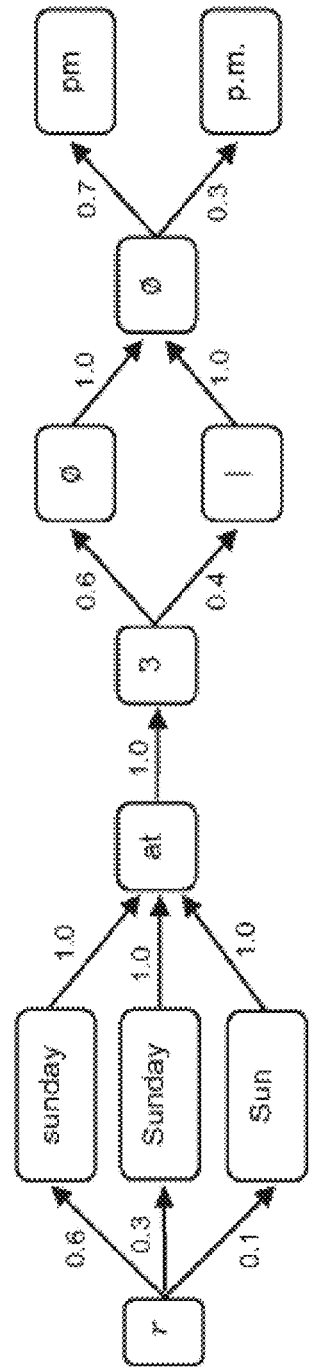

And finally a lexical variant analyser is deployed as illustrated in FIG. 6d.

Note that due to PCSG property 3, branches must converge before re-branching. This means that in some cases an empty node must be inserted, if two branch points occur contiguously.

Edge probabilities are preferably assigned to the PCSGs. The assignment of edge probabilities is preferably carried out with respect to the parameters of the context candidate model. The intuitive interpretation of these probabilities is twofold:

1) They represent an estimate of the likelihood that the user intended the sequence assigned to a particular branch. For example, if a user has entered "Dear ben", we might want to allow, with some probability, that they actually intended to enter "Dear Ben".
2) They represent a "backoff" likelihood that a particular branch is a valid orthographic variant of the observed sequence. For example, if the user has entered "See you on Thur", an alternative orthographic form of "Thur" would be "Thurs".

The probability assigned to a particular edge can also be influenced by the estimated likelihood of that orthographic variant given some background model information. For instance, the context sequence model S can actually be reused to obtain an estimate of the likelihood of different orthographic variants, which can be used in combination with other probabilistic measures to yield branch probabilities. Utilising the context sequence model in this manner means that the context candidate model C actually contains an instance of the context sequence model S, which results in an obvious violation of the independence assumption between the candidate and sequence models (property 7 above); however, this assumption is never actually called upon in the context case so it is relatively safe.

An example will help to clarify. In a preferred embodiment, it is assumed that the context candidate model assigns probabilities using the following algorithm:
1) Observed sequence receives 0.8 probability; others receive the balance uniformly.
2) Values are scaled by the context sequence model estimates.
3) Values are normalised to comply with PCSG property (19) above.

Figure 7A:
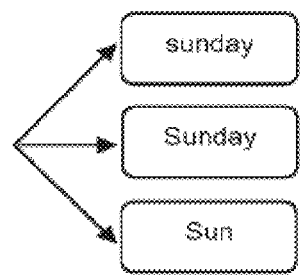
FIGS. 7a, 7b, and 7c illustrate an example of a branch from a probabilistic constrained sequence graph with unnormalized and normalized probabilities, in accordance with some embodiments.

From the above PCSG example, the branch illustrated in FIG. 7a can be considered.

Figure 7B:
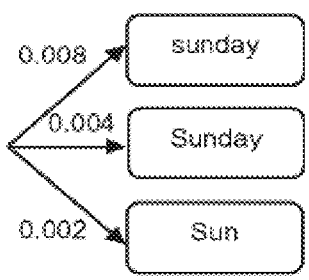
Figure 7C:
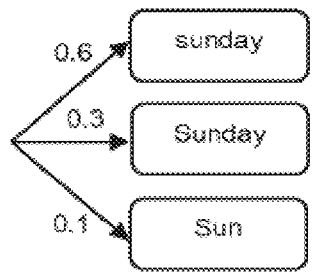

As "sunday" is the original observation, it will initially be assigned a probability of 0.8 by stage one of the above algorithm, and the other edges will each be assigned 0.1. For the example where the estimates returned by the context sequence model are as follow:

P("sunday" $C^s$)=0.01
P("Sunday"|$C^s$)=0.04
P("Sun"|$C^s$)=0.02 where $C^s$ denotes that the context candidate model is utilising the context sequence model in this case. Thus, in this example the unnormalised and normalised (rounded) probabilities assigned to each edge are illustrated in FIG. 7b and FIG. 7c, respectively.

Context Prior Estimate

The context prior, P(context|$M_{context}$) can be approximated by normalising the frequency of the original sequence t associated with context $$P(\text{context} | M_{context}) \cong \frac{freq(t)}{\sum_{t'} freq(t')} \quad (21)$$

where freq(t) is the frequency of sequence t in the training data and the denominator is the sum of the frequencies of all sequences in the training data. The sequence "t" in expression (21) is the current context, as input into the system. The context prior weights the probability values of predictions according to the probability that the corresponding model from which the prediction was drawn, comprises a given context sequence. To do this, the context prior weights the predictions values according to the estimate of expression (21).

In practice, this estimate would be smoothed, for example by positing an occurrence assumption on unseen sequences, or by backing off to restricted (lower order) estimates in instances where the full sequence is unseen. For example, if the context is a trigram, the prediction engine may be configured to back off to constituent bigram or unigram estimates.

The context prior provides a dual function: It helps to normalise the probability estimate; and provides simple 'model detection' when the context model is unable to provide useful information. If the context sequence estimate is uninformative (such as when the last term is unknown to an N-gram model), the context prior estimate will weight more heavily the model with the most likely context, promoting the predictions of this model above those from other models. The "most likely context" is the maximum of estimate (21) over the set of models, for example over the set of language models $LM_{English}$, $LM_{French}$, $LM_{German}$ etc. For example, if the context is "The dog chased", it would be expected that this is significantly more likely to appear in English than in French. Thus, the conditional probability of equation (21) will be greatest for $LM_{English}$, and the probability generator will therefore weight the probability values of predictions drawn from $LM_{English}$ more heavily than those drawn from $LM_{French}$; thus $LM_{English}$ is 'favoured' by the context prior estimate.

Thus, the context prior estimate weights more heavily the most appropriate language model from a plurality of language models relating to a plurality of languages, given the context. In this sense, the context prior estimate is able to detect the language in which someone is inputting text.

Target Sequence Prior Estimate

The target sequence prior, $P(s|M_{context})$ can be estimated using smoothed frequency analysis on the training data, in a similar way to the context prior estimate, equation (21), e.g. the target sequence prior can be approximated by normalising the frequency of the target sequence over all sequences in the context training data $$P(s | M_{context}) \cong \frac{freq(s)}{\sum_{s'} freq(s')}$$

where freq(s) is the frequency of the target sequence in the training data and the denominator is the sum of all the frequencies of all target sequences in the training data. The denominator can equivalently be approximately determined as the total number of terms in the training data (counting duplicates).

Input Likelihood

The input likelihood, $P(\text{input}|s, M_{input})$, is estimated by means of the first candidate model:

$$P(\text{input}|s, M_{input}) = \sum_{j=1}^{K} P(\text{input}|c_j, M_{input\text{-}candidate}) P(c_j|s, M_{input\text{-}sequence}) \quad (22)$$

Thus, to determine the input likelihood, the following estimates need to be computed: an input candidate estimate, $P(\text{input}|c_j, M_{input\text{-}candidate})$; and an input sequence estimate. $P(c_j|s, M_{input\text{-}sequence})$. Each estimate is described below.

Input Candidate Estimate

The input candidate estimate, $P(\text{input}|c_j, M_{input\text{-}candidate})$ is defined as a function on observed input events and sequences: $f_{input\text{-}candidate}(i,t) = P(i|t, \theta_{input\text{-}candidate})$ where $\theta_{input\text{-}candidate}$ are the parameters of the model. An arbitrary input observation i is encoded in an input sequence intention structure (ISIS), which is an ordered list of sets of sequences mapped to probabilities:

$$\{(t_{1\_1} \to P(i_1|t_{1\_1}), (t_{1\_2} \to P(i_1|t_{1\_2})\}, \ldots, \{(t_{2\_1} \to P(i_2|t_{2\_1}), (t_{2\_2} \to P(i_2|t_{2\_2}), \ldots\}, \ldots$$

Note that each individual estimate has the form $P(i_j|t_{j\_k})$, i.e. if the user had intended to enter the sequence $t_{j\_k}$, what's the probability that we would have observed input event $i_j$. Consider the following ISIS example:

$$\begin{bmatrix} \{(H \to 0.5), (h \to 0.3), (g \to 0.1), (j \to 0.1)\} \\ \{(e \to 0.8), (w \to 0.1), (r \to 0.1)\} \end{bmatrix}$$

This encodes the scenario in which the system estimates that had the user intended to enter, e.g., the character 'H' followed by the character 'e', so the observed input events would be expected to have the respective probabilities of 0.5 and 0.8.

The method by which these probability distributions are generated is not the subject of this disclosure. Rather it is highlighted that a range of techniques are applicable, for instance:

- Distributions can be generated on the basis of the characters that surround a given target key on a particular keyboard layout, e.g. for a QWERTY keyboard, if the user tapped the area corresponding to the "H" key, the characters "G" and "J" might be included in the ISIS, with some probability.
- Distributions can be generated on the basis of the distances (or some function of the distances, such as the square etc.) between the touch coordinate (on a touchscreen virtual keyboard) and the coordinates of designated keys.

In the preferred system, an input candidate is a sequence, and the set of input candidates is represented as an extended PCSG (EPCSG). An EPCSG is a PCSG but with one additional structure that violates standard PCSG properties (defined below). As in the context case, each individual candidate sequence is represented by a unique path through the EPCSG and the input candidate model function return value for a given candidate is computed as the normalised probability of its representative path.

The input candidate EPCSG generation process starts with an ordered list of sets of sequence-probability pairs, generated by the system from user interaction, where each subset represents a probability distribution over user input sequence intentions.

The algorithm to generate an input candidate EPCSG from an input ISIS has two stages:
1) Convert the ISIS into a PCSG.
2) Insert additional generalising structures, resulting in an EPCSG.

Figure 8:
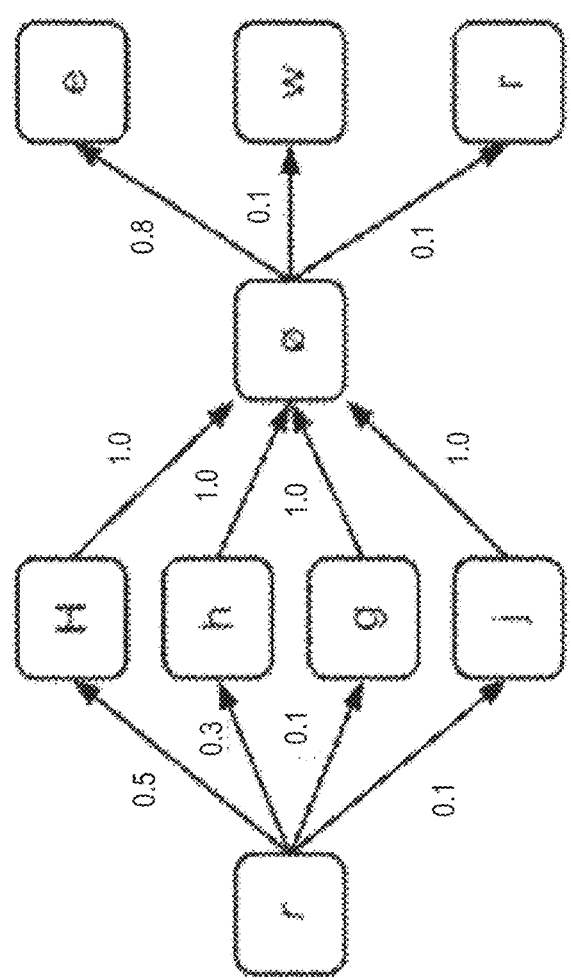
FIG. 8 illustrates an example of converting an input sequence intention structure to a probabilistic constrained sequence graph, in accordance with some embodiments.

Stage one is straightforward. Beginning with the root node of a new PCSG, the algorithm constructs branches for each distribution in the ISIS. The result of stage one for the above ISIS may appear like FIG. 8.

Figure 9:
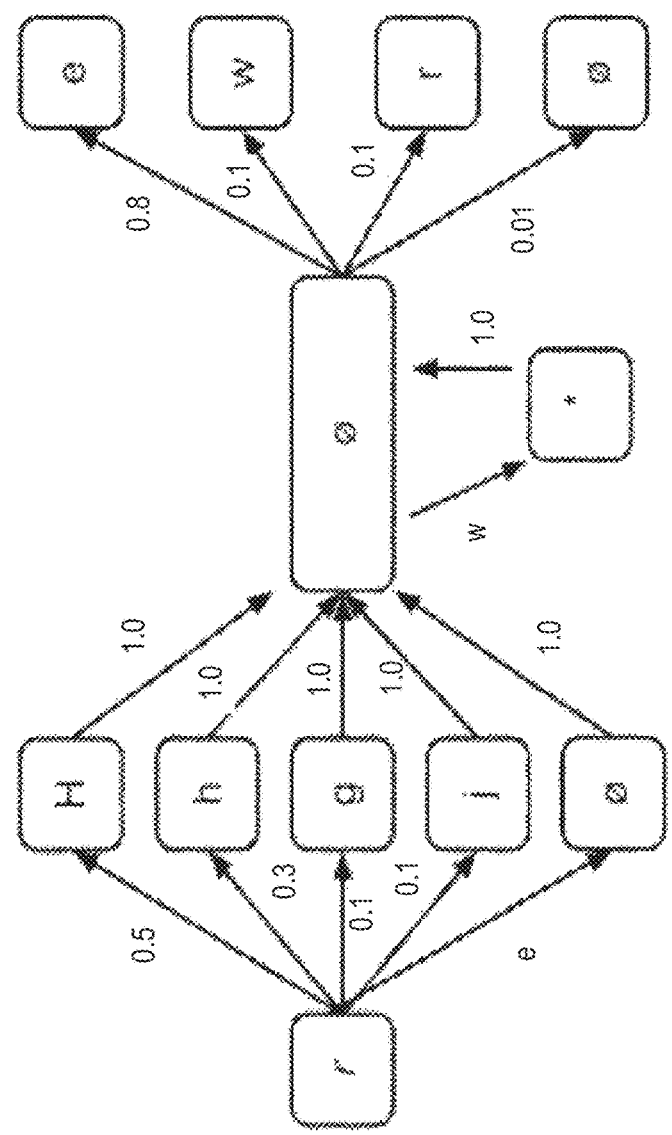
FIG. 9 illustrates an example of an extended augmented probabilistic constrained sequence graph, in accordance with some embodiments.

Stage two embellishes the existing PCSG with two additional structures. The first is an empty node sub-path (which falls within the PCSG framework), and the second is a 'wildcard' structure (which converts the PCSG into an EPCSG). FIG. 9 is an example application of stage two.

The wildcard symbol (denoted by '*') is actually shorthand for a branch that includes/generates every symbol in the character set. The wildcard structure is a constrained cycle and therefore violates the acyclic property of the standard PCSG. The EPCSG extension licenses the use of a wildcard cycle at convergence points only. The values e and w are pre-specified probability constants. Note that in this case each branch point has the empty node addition (two in this case), and each convergence point has the wildcard addition (one in this case). These generalisations allow for instances where the user omitted one or more characters from the target sequence (with the wildcard probability w) or inserted one or more erroneous characters (with the empty node probability e). It will be understood that the specifics of how these extra structures are added to the PCSG will vary with different instantiations of the system, depending on computational resources, sequence model strength, etc.

The empty node sub-path enables the system to disregard a character which has been erroneously entered by the user, and which would otherwise lead to an incorrect chain through the PCGS.

With the addition of the generalisation structures (especially the wildcard branch), the number of paths through the PCSG grows rapidly. For instance, given a character set size of 50 there are 1020 unique paths through the simple PCSG above. For a real-world ISIS, there can be tens or even hundreds of thousands of unique paths. The preferred system preferably utilises the following techniques, alone or in any combination, to handle this combinatorial explosion:

A trie (as known in the art) is used to ignore paths that are not prefixes of sequences within the prediction vocabulary.

Probabilistic thresholding is used to prune paths that are relatively improbable. A threshold is set on the ratio between the current most probable sequence and the differential for less probable sequences. Given threshold t, and a currently investigated path length L, a path $n_1 \ldots n_L$ is pruned if the following holds:

$$\frac{P(n_1 \mid r)\prod_{j=2}^{L} P(n_j \mid n_{j-1})}{\mathrm{argmax}_m [P(m_1 \mid r)\prod_{j=2}^{L} P(m_j \mid m_{j-1})]} < t \quad (23)$$

The input sequence model T is also used for probabilistic thresholding. Given a distinct or tied threshold t, and a set of sequences formed by all paths of length L: $\{c_1, \ldots, c_K\}$ a given path p representing a particular sequence $c_p$ is pruned if the following holds:

$$\frac{P(c_p \mid T)}{\mathrm{argmax}_j [P(c_j \mid T)]} < t \quad (24)$$

Other techniques which are suitable for handling the combinatorial explosion can also be employed by themselves, or in combination with one or all of the above techniques.

Input Sequence Estimates

The input sequence estimate, $P(c_j|s, M_{input\text{-}sequence})$ is a distribution over candidate sequences given a target sequence, and can be estimated as a normalised indicator function:

$$P(c_j \mid s, M_{input\text{-}sequence}) = \frac{\delta(s, c_j)}{Z} \quad (25)$$

where $\delta(t,t')=1$ if t' is a prefix of t and 0 otherwise, and $Z=\Sigma_k \delta(s,c_k)$, i.e. the sum over all candidates.

Note that if uniqueness of candidates is assumed, and the set of candidates is allowed to include all possible sequences, the normalisation factor can be re-cast: Z=length(s). For example, given the target sequence "the", there will always be precisely three matching candidates: "t", "th" and "the".

Thus, the present invention provides a general text prediction engine and system, and a specific example of that text prediction engine or system, which is configured to generate a set of sequence predictions $S_F$, each with an associated probability value $P_F$.

The present invention also provides a corresponding method for processing user text input. Turning to FIG. 1 and the above described system, the method comprises receiving text input into a user interface, e.g. of an electronic device; generating, using a text prediction engine, sequence predictions $S_F$ and associated probability values $P_F$; and providing the sequence predictions to the user interface.

As discussed in relation to the system, the general method comprises generating sequence predictions and associated probability values by a text prediction engine which comprises one or more models. In a preferred embodiment, the method comprises generating sequence predictions from a target prior model R and from at least one model $M_1$, $M_2$, etc which uses at least one evidence source $e_1$, $e_2$, etc. to generate predictions. As discussed above, in relation to the system and, in particular, expressions (12) to (15), the method comprises generating normalised probability values by estimating a normalisation factor for the probability values by summing the probability values for the n most probable sequence predictions and a constant representative of the remaining possible sequence predictions.

With reference to FIG. 2, in the preferred embodiment, the final set of predictions $S_F$ and associated probability values $P_F$ are generated by a probability generator PG, from sets of predictions $S_R$, $S_{context}$ $S_{input}$ which have been drawn from a target prior model R, a context model $M_{context}$, and an input model $M_{input}$, respectively. In this embodiment, the context of a user entered sequence is used as evidence to draw predictions from the context model $M_{context}$, and a user entered sequence relating to the current word the user is attempting to enter is used as evidence to draw predictions from the input model $M_{input}$.

Other aspects of the method are analogous to the system described above, e.g. in one embodiment of the method, the sequence predictions are only provided to the user interface if their corresponding probability values are each greater than or equal a first threshold value.

As discussed above in relation to a system implementing generalisation structures (and especially a wildcard branch)

in a PCSG to determine a context candidate estimate, in a preferred embodiment of the method, at least one of the set of sequence predictions corresponds to an adjusted or corrected version of text input by a user into the user interface.

Other aspects of the method of the present invention can be readily determined by analogy to the above system description.

What is claimed:

1. A text prediction system, comprising:
   one or more processors;
   memory storing instructions that, when executed by the one or more processors, configure the one or more processors to:
   generate a first sequence prediction based on a first evidence source including a first sequence of characters and a context of the first sequence of characters, and a first model that implements a context model including a first candidate model implementing a conditional distribution of the context for a first particular candidate and a prefix match model implementing a conditional distribution of candidates for a target sequence, wherein the first sequence prediction comprises a first sequence and a first associated probability estimate;
   generate a second sequence prediction based on a second evidence source including a second sequence of characters and a second model that implements an input model including a second candidate model implementing a conditional distribution of inputs for a second particular candidate and a language model implementing a conditional distribution of sequences in a language for a particular context, wherein the second sequence prediction comprises a second sequence and a second associated probability estimate; and
   a display coupled to at least one of the one or more processors or the memory, wherein the display is configured to:
   output the first sequence prediction and the second sequence prediction within a text entry graphical user interface.

2. The system according to claim 1, wherein one of the first evidence source or the second evidence source is based upon input representing observed evidence about a word that a user is currently entering and the other of the first evidence source or the second evidence source is not based upon the input representing the observed evidence about the word the user is currently entering.

3. The system according to claim 2, wherein the first evidence source is modelled independently of the second evidence source.

4. The system according to claim 3, wherein the first model is different from the second model.

5. The system according to claim 4, wherein the first evidence source is modelled by the first model to generate the first sequence prediction and the second evidence source is modelled by the second model to generate the second sequence prediction.

6. The system according to claim 1, further comprising a prior model configured to generate a third set of sequences with associated probability estimates.

7. The system according to claim 6, wherein the prior model comprises a unigram model.

8. The system according to claim 6, wherein the prior model comprises a character model.

9. The system according to claim 1, wherein the first evidence source is modelled independently of the second evidence source.

10. The system according to claim 9, wherein the first evidence source is modelled by the first model to generate the first sequence prediction and the second evidence source is modelled by the second model to generate the second sequence prediction.

11. A computing device comprising one or more processors and memory storing instructions that, when executed by the one or more processors, configure the computing device to:
   generate a first sequence prediction based on a first evidence source including a first sequence of characters and a context of the first sequence of characters, and a first model that implements a context model including a first candidate model implementing a conditional distribution of the context for a first particular candidate and a prefix match model implementing a conditional distribution of candidates for a target sequence, wherein the first sequence prediction comprises a first sequence and a first associated probability estimate;
   generate a second sequence prediction based on a second evidence source including a second sequence of characters and a second model that implements an input model including a second candidate model implementing a conditional distribution of inputs for a second particular candidate and a language model implementing a conditional distribution of sequences in a language for a particular context, wherein the second sequence prediction comprises a second sequence and a second associated probability estimate; and
   the computing device further comprising a display coupled to at least one of the one or more processors or the memory, wherein the display is configured to output the first sequence prediction and the second sequence prediction within a text entry graphical user interface.

12. A method for predicting text by a computing device, the method comprising:
   generating, by the computing device, a first sequence prediction based on a first evidence source including a first sequence of characters and a context of the first sequence of characters, and a first model that implements a context model including a first candidate model implementing a conditional distribution of the context for a first particular candidate and a prefix match model implementing a conditional distribution of candidates for a target sequence, wherein the first sequence prediction comprises a first sequence and a first associated probability estimate;
   generating, by the computing device, a second sequence prediction based on a second evidence source including a second sequence of characters and a second model that implements an input model including a second candidate model implementing a conditional distribution of inputs for a second particular candidate and a language model implementing a conditional distribution of sequences in a language for a particular context, wherein the second sequence prediction comprises a second sequence and a second associated probability estimate; and
   outputting, on a display device communicatively coupled to the computing device, the first sequence prediction and the second sequence prediction within a text entry graphical user interface.

* * * * *